Figure 13:
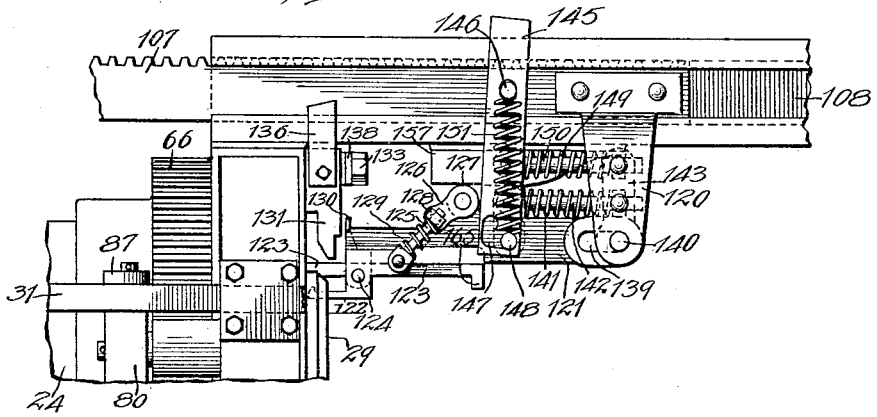

R. T. JOHNSTON.
STEREOTYPE PLATE FINISHING AND COOLING MACHINE.
APPLICATION FILED MAY 23, 1913.
1,126,771.
Patented Feb. 2, 1915.
8 SHEETS—SHEET 1.
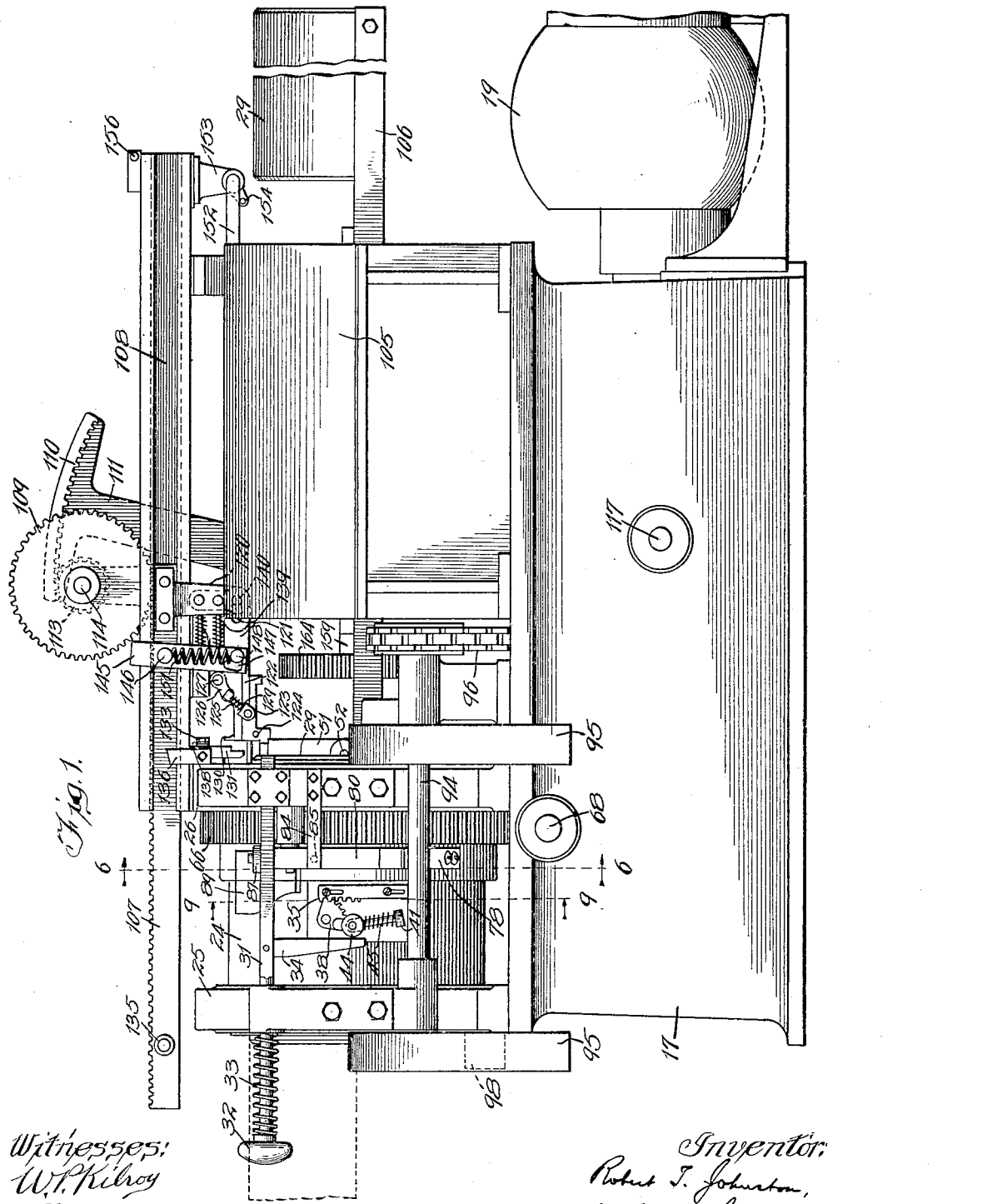

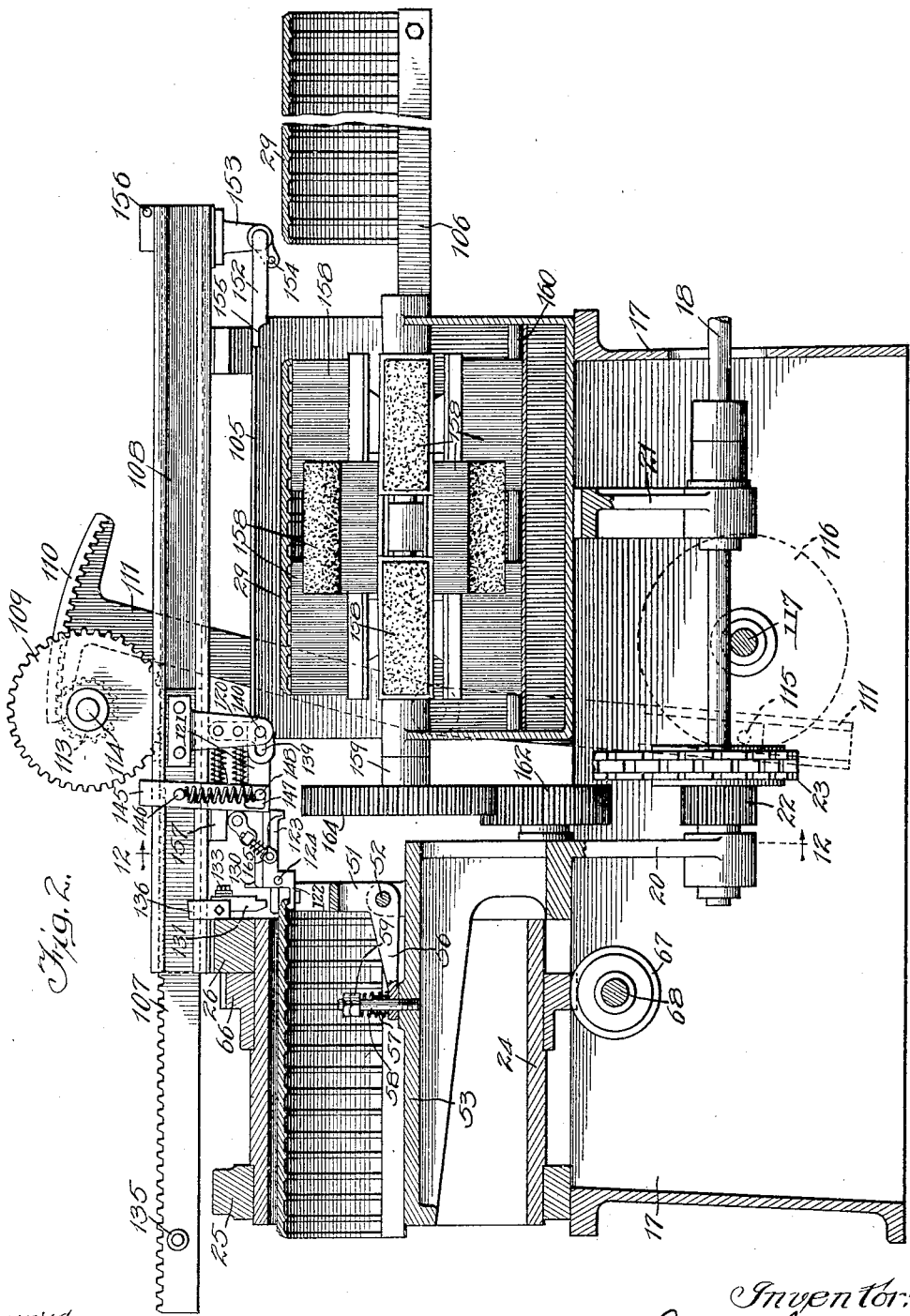

R. T. JOHNSTON.
STEREOTYPE PLATE FINISHING AND COOLING MACHINE.
APPLICATION FILED MAY 23, 1913.
1,126,771.
Patented Feb. 2, 1915.
8 SHEETS—SHEET 3.
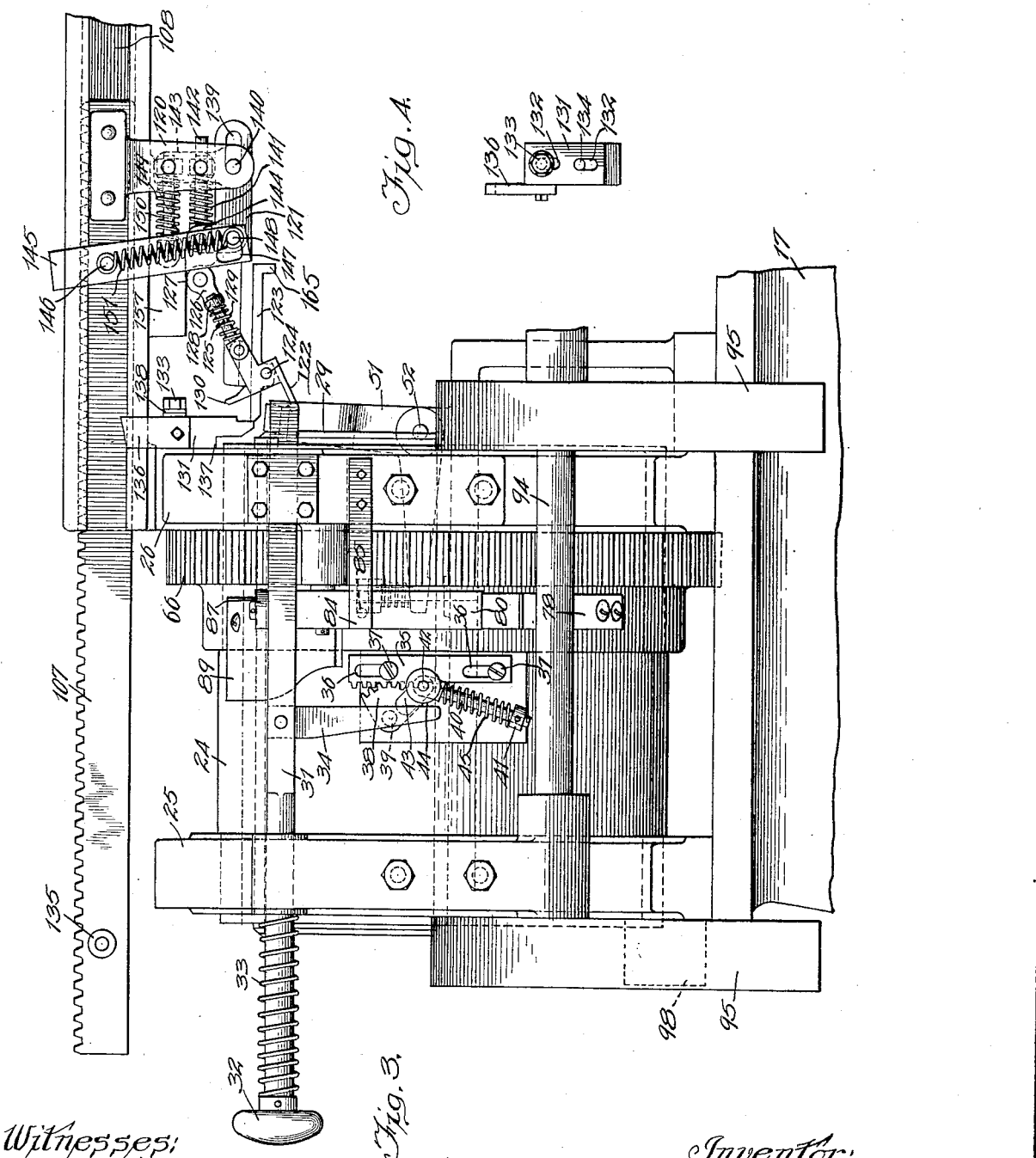

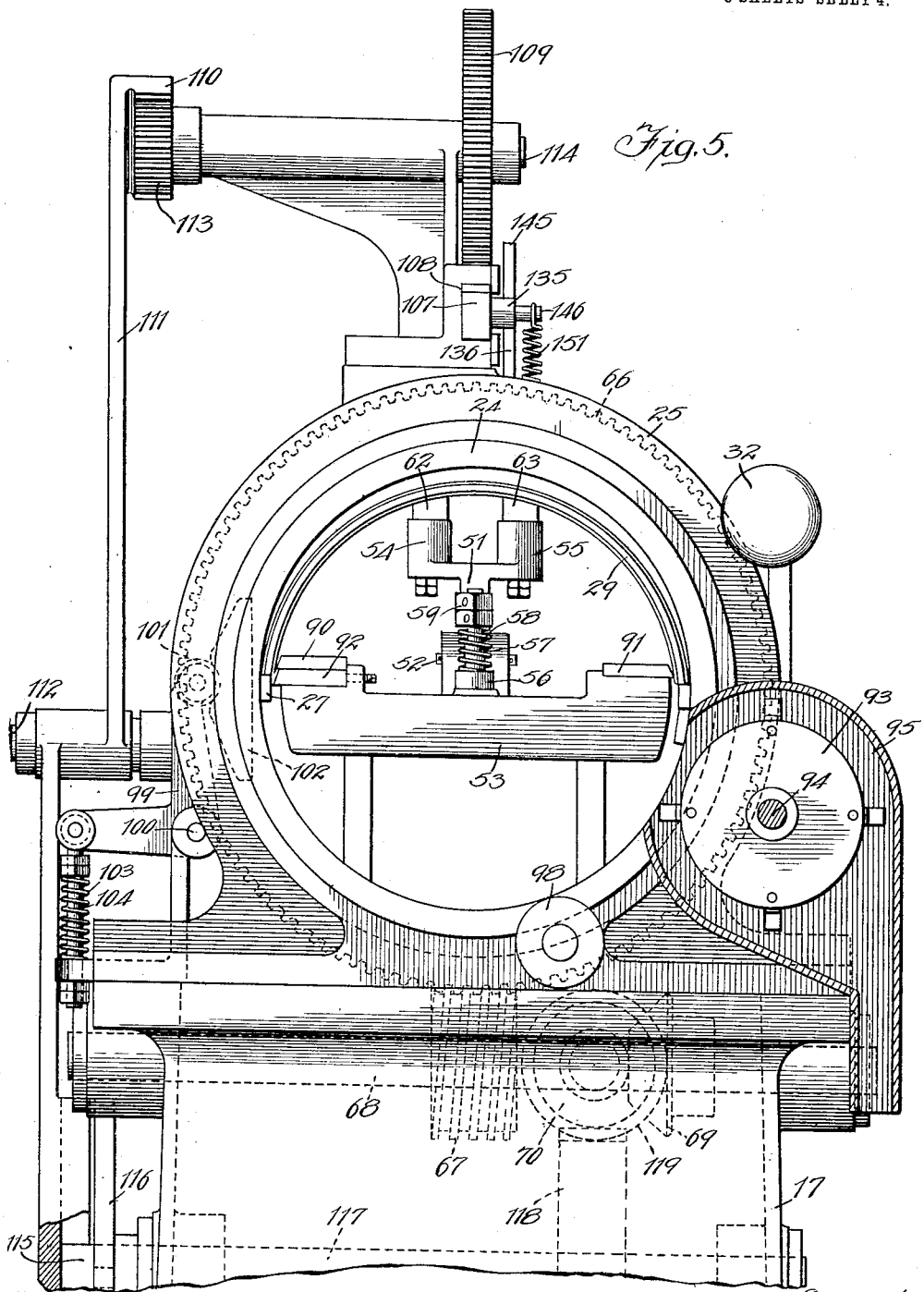

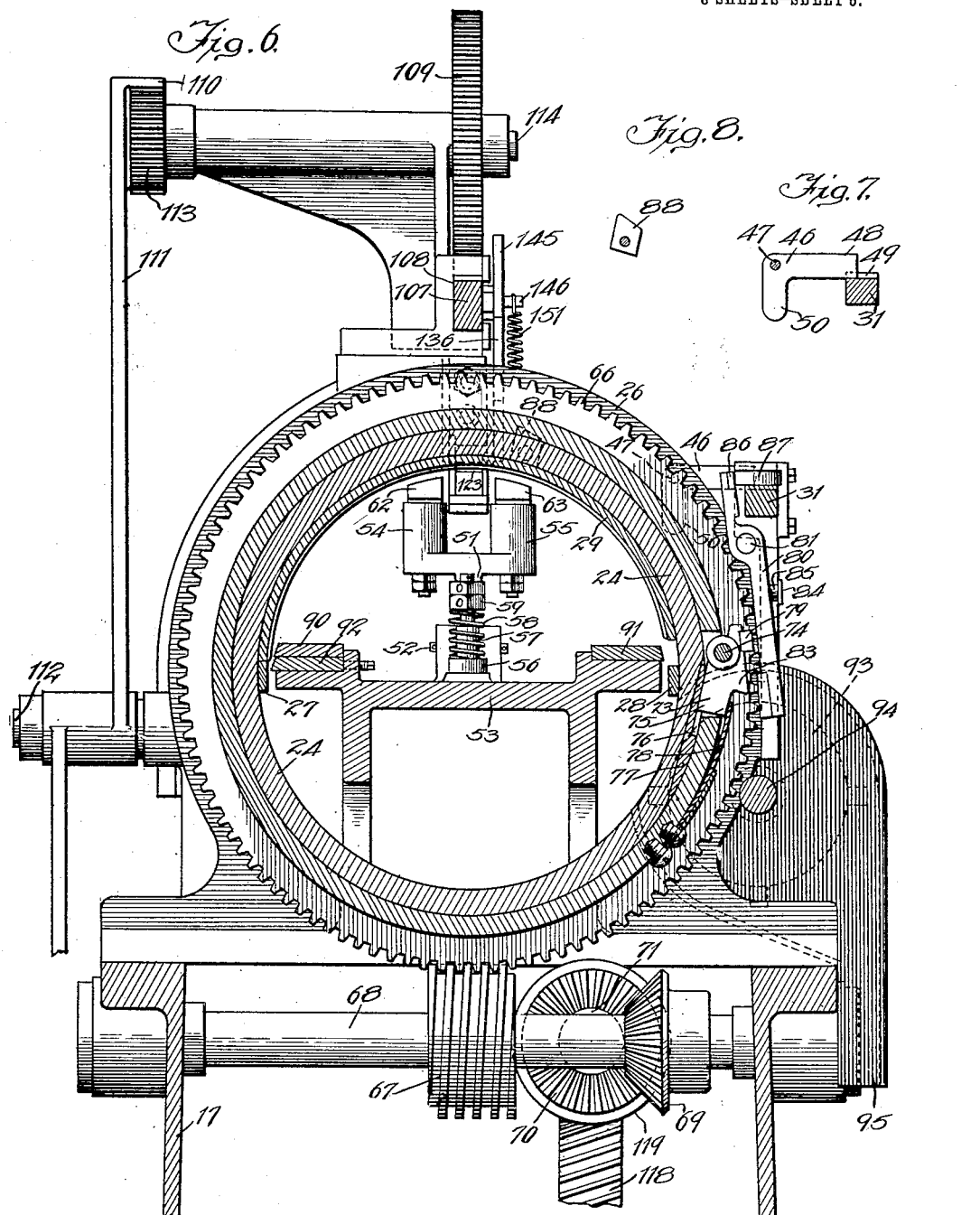

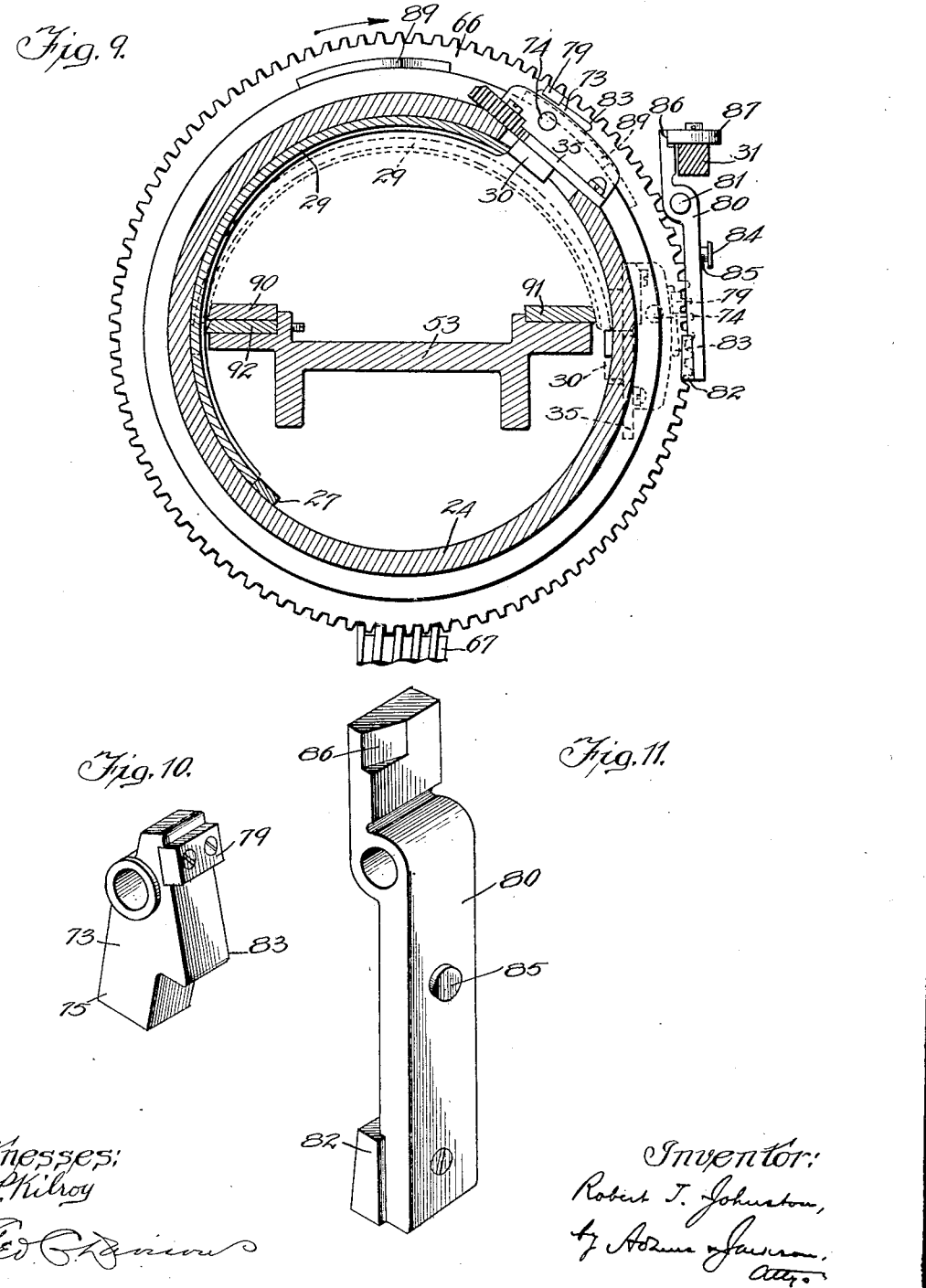

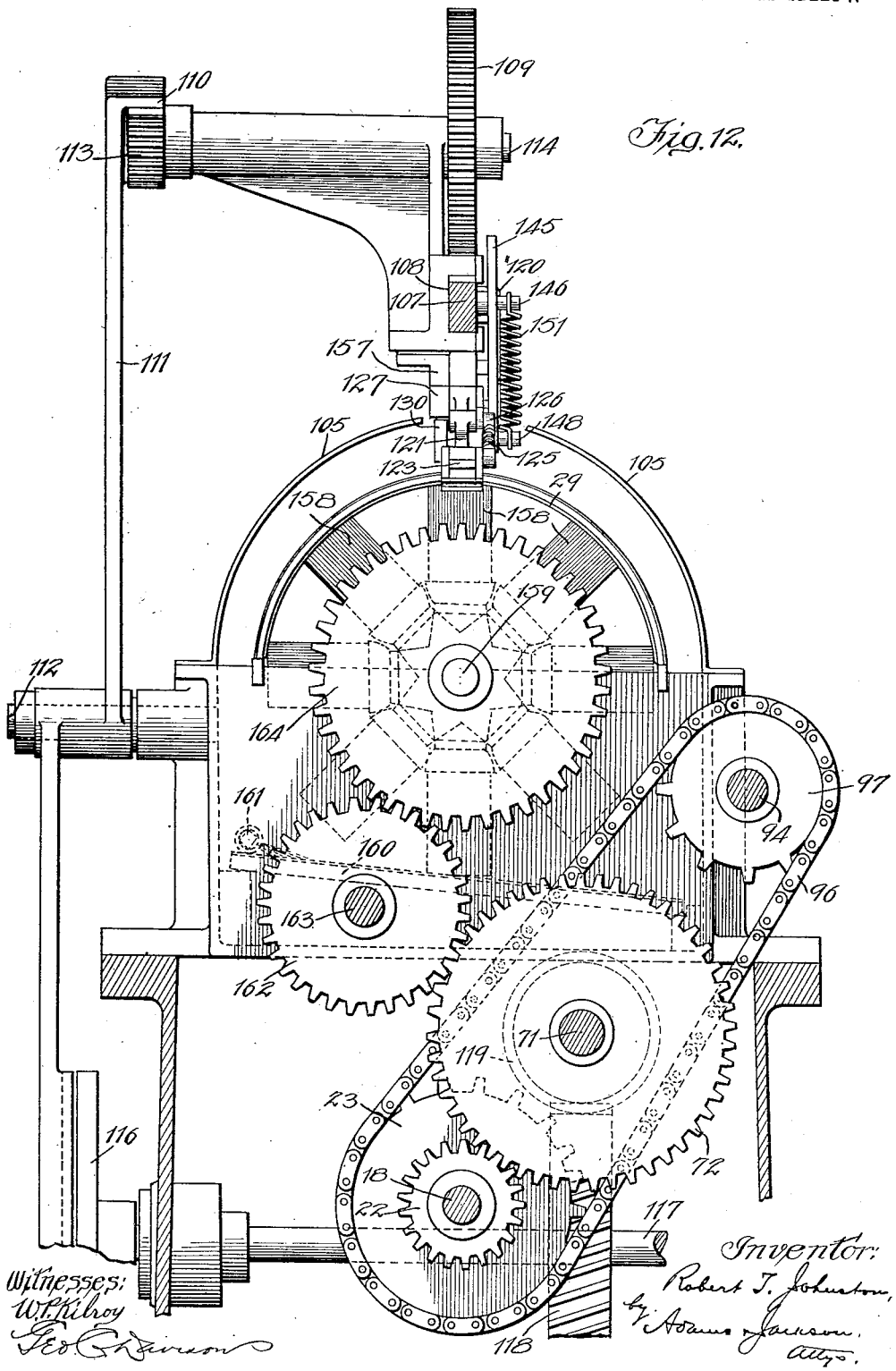

R. T. JOHNSTON.
STEREOTYPE PLATE FINISHING AND COOLING MACHINE.
APPLICATION FILED MAY 23, 1913.

1,126,771.

Patented Feb. 2, 1915.
8 SHEETS—SHEET 8.

Witnesses:
W. F. Kilroy
Geo. E. Davison

Inventor:
Robert T. Johnston,
by Adams & Jackson,
Attys.

THE NORRIS PETERS CO., PHOTO-LITHO., WASHINGTON, D. C.

UNITED STATES PATENT OFFICE.

ROBERT T. JOHNSTON, OF CHICAGO, ILLINOIS, ASSIGNOR TO THE GOSS PRINTING PRESS COMPANY, OF CHICAGO, ILLINOIS, A CORPORATION OF ILLINOIS.

STEREOTYPE-PLATE FINISHING AND COOLING MACHINE.

1,126,771.  Specification of Letters Patent.  Patented Feb. 2, 1915.

Application filed May 23, 1913. Serial No. 769,392.

*To all whom it may concern:*

Be it known that I, ROBERT T. JOHNSTON, a citizen of the United States, residing at Chicago, in the county of Cook and State of Illinois, have invented certain new and useful Improvements in Stereotype-Plate Finishing and Cooling Machines, of which the following is a specification, reference being had to the accompanying drawings.

My invention relates to machines for finishing and cooling stereotype-plates after they have been cast, to prepare them for attachment to the press. As is well understood by those skilled in the art, stereotype-plates for use on rotary presses are cast with a riser, or tail-piece, at one end, and in preparing them for the press it is necessary to remove the riser, to bevel the ends of the plate, to shave the ribs on the interior of the plate, and to cool the plate so that it can readily be handled and printed from, and my improved machine is designed to perform all these operations, so that the plate, when it leaves the machine, is ready for attachment to the press. In some machines of this character as heretofore constructed, the stereotype-plate with the riser attached has been moved into a rotatable, cylindrical shell over a semi-cylindrical support known as a saddle, the plate when being introduced into the shell being automatically locked in position and also unlocked by the rotation of the shell. During the rotation of the shell the plate is carried around with it and while so rotating is operated upon by end-trimmers or cutters, which sever the riser from the plate and bevel the ends thereof, and also by a shaving device which shaves the ribs on the interior surface of the plate. My improved machine also employs a rotatable shell to receive the plate and hold it during the shaving and end-trimming operations, but one of the objects of my present invention is to provide for locking the plate in position in the shell before the shell begins to rotate, and for releasing the plate after the rotation of the shell ceases, so that the locking and unlocking of the plate are independent of the movement of the shell, and in the construction shown and described this object is attained.

Another distinctive feature of my present invention is that upon the locking of the plate in position in the shell the rotation of the shell is automatically started, instead of the rotation of the shell being initiated by the operator and the locking of the plate being afterward automatically effected, as has heretofore been proposed. Furthermore, although the operator controls the setting of the shell in rotation, my invention provides means by which after the shell begins to rotate it automatically stops upon the completion of its rotation and the plate is afterward automatically released so that it is in condition for withdrawal, and the several parts of the machine adjust themselves to receive the succeeding plate.

Another distinguishing characteristic of my improved machine is that the shell is rotated by a constantly driven gear which is normally disconnected from or out of operative engagement with the shell, but is automatically connected therewith when a plate has been introduced thereinto and locked in position, and is also automatically disconnected from the shell after the latter has made a complete rotation.

My invention further provides for automatically withdrawing the plate from the shell at the end opposite that at which it is introduced, the action of the withdrawing mechanism being automatically controlled, so that it cannot engage the plate until the rotation of the shell ceases and the plate is unlocked.

For cooling the plates after finishing, it has heretofore been customary to spray or sprinkle the plates with water, which necessitated drying them to get rid of the water accumulating thereon before they could be attached to the press, and a further important object of my invention is to avoid the necessity of drying the plates, by cooling them in such manner as to prevent the accumulation of water thereon, and my present invention accomplishes this end by brushing them with dampened brushes or wipers, which rotate through a water bath, so that the heat is taken up by the brushes, which are in turn cooled by being dipped in water, with the result that the plates are cooled without accumulating any free water and when delivered from the cooling device are dry and cool and ready for attachment to the press.

With the foregoing brief statement of the salient characteristics of my improved machine I shall now describe in detail the embodiment of my invention illustrated in the accompanying drawings, it being understood, of course, that my invention is not restricted to the specific construction shown and described, except in so far as the claims are directed to details of construction.

Figure 14:
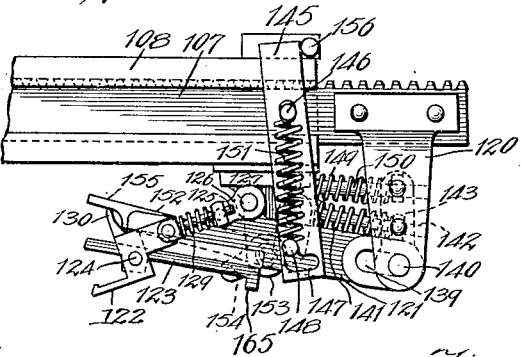
Figure 16:
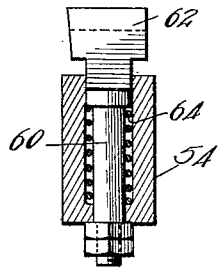
Figure 15:
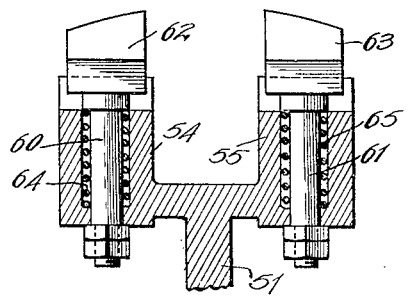

In the accompanying drawings,—Figure 1 is a side elevation of my improved machine; Fig. 2 is a longitudinal vertical section thereof; Fig. 3 is an enlarged partial side elevation, the cooling mechanism being omitted; Fig. 4 is a detail illustrating the stop which controls the action of the plate withdrawing mechanism; Fig. 5 is an enlarged end view of the inlet end of the finishing portion of the machine; Fig. 6 is a vertical cross-section on line 6—6 of Fig. 1; Fig. 7 is a detail illustrating the latch by which the plate-locking bar is temporarily locked in its innermost position; Fig. 8 is a detail of the cam by which the latch shown in Fig. 7 is actuated to release said bar, and by which also the action of the plate-withdrawing mechanism is controlled; Fig. 9 is an enlarged detail, being a vertical cross-section of the shell on line 9—9 of Fig. 1, certain parts being omitted for the sake of clearness; Fig. 10 is a perspective view of the pawl by which the shell is temporarily connected with the constantly rotating driving gear hereinbefore referred to, when the shell is to be rotated; Fig. 11 is a perspective view of a detent lever which operates to disconnect the pawl shown in Fig. 10 from the shell when the shell has completed its rotation; Fig. 12 is an enlarged vertical cross-section on line 12—12 of Fig. 2 showing in end elevation the cooling mechanism and the driving connections; Fig. 13 is an enlarged detail, being a partial side elevation of the mechanism for withdrawing the plate from the shell after it has been finished and moving it into the cooling mechanism; Fig. 14 is a similar view, showing the position of the gripping mechanism after it has released the plate and the latter has been moved into the cooling mechanism; Fig. 15 is an enlarged sectional detail illustrating the stops by which the movement of the plate into the finishing shell is arrested when the plate has been properly positioned in the shell; and Fig. 16 is a view of one of the stops taken at right angles to the position shown in Fig. 15.

Referring to the drawings,—17 indicates the base of the machine, which is of suitable dimensions and shape to support the various parts of the machine.

As best shown in Figs. 1 and 2, the drive shaft 18 is mounted in the base and is driven by an electric motor 19, or from any other suitable source of power, said shaft being constantly driven while the machine is in use. In the construction illustrated, the shaft 18 is supported by suitable bearings carried by hangers 20—21.

22 indicates a pinion mounted on the shaft 18, and 23 indicates a sprocket wheel also mounted on said shaft adjacent to the pinion 22, as shown in Fig. 2. The various parts of the mechanism are driven from the pinion 22 and the sprocket wheel 23, as will be hereinafter more fully described.

24 indicates the finishing shell, which is mounted to rotate in an annular bearing 25, best shown in Fig. 2, said bearing being mounted on the base 17 and being arranged near the inlet end of the shell, as shown.

26 indicates another bearing arranged near the opposite end of the shell, also shown in Fig. 2.

As best shown in Fig. 6, the shell 24 is provided on its interior at substantially opposite points with longitudinally-extending ledges or ribs 27—28, which are adapted to receive and support the stereotype plate 29. Said ledges are so placed that when the plate is resting upon them it is loose in the shell,—that is to say, its outer face is not closely in contact with the interior of the shell, as illustrated in Fig. 2. Said plate is, however, adapted to be moved up into close contact with the shell so as to lock it in position by mechanism which will be hereinafter described. The unlocked position of the shell is also illustrated in dotted lines in Fig. 9. The ledge 27 is preferably continuous from end to end of the shell, but the ledge 28 is broken intermediately, preferably at the center, to admit a locking lug 30, which projects between the separated portions of the ledge 28 so as to lie under the side margin of the plate 29 when the latter rests upon said ledges. By moving said lug upward between the separated portions of the ledge 28 it will lift the adjacent side edge of the plate and move the plate into engagement with the interior of the shell, thereby locking it in position, as illustrated in Fig. 9, which shows the plate after it has been partly finished. In practice, the plate as it comes from the casting machine with the riser attached, is moved by hand into the shell, its side margins resting upon the ledges 27—28, and when it has been shoved into the proper position the lug 30 is moved up to lift the adjacent margin of the shell off of the ledge 28 into engagement with the interior of the shell and hold it there during the rotation of the shell. For the purpose of moving the lug 30 to lock the plate in position I provide the following mechanism:

31 (see Fig. 3) indicates a longitudinally movable locking rod or bar which is mounted in suitable bearings in a stationary part of the machine, such as the bearings 25—26, and which projects out beyond the inlet end of the machine so that it may be conveniently actuated by the operator. Said locking bar is provided with a hand-piece 32 for convenience in operating it.

33 indicates a spring mounted on the bar 31 between the hand-piece 32 and the bearing 25, for normally holding the bar in its projected position, as best shown in Figs. 1 and 3.

34 indicates a downwardly projecting finger carried by the bar 31.

35 indicates a rack-bar, which is arranged in a vertical position at one side of the shell 24 and rotates with the shell. Said rack-bar is movable longitudinally of itself, being provided with slots 36, through which extend pins 37, by which it is connected to the shell 24. The rack-bar 35 carries the lug 30 so that when said bar moves upward, it carries up the lug 30 into locking position, as shown in Fig. 9. The teeth of the rack-bar 35 mesh with the teeth of a segmental gear 38, which is pivotally mounted upon the shell 24, as shown at 39 in Fig. 3, so that by rocking said segmental gear, the bar may be moved up or down as the case may be.

40 indicates a rod which is longitudinally movable in a collar 41, secured to the side of the shell 24, as shown in Fig. 3, said rod being pivotally connected with the segmental gear 38 by a pin 42, fitted in a slot 43 in said segmental gear. The pin 42 carries a roller 44, which is adapted to be engaged by the finger 34, as shown in Fig. 1.

45 indicates a spring mounted on the rod 40 between the pivot 42 and the collar 41. The rod 40 and the segmental gear 38 form a toggle, by which the segmental gear 38 is held either in the position shown in Fig. 1, which is the unlocking position, or the position shown in Fig. 3, which is the locking position. It will be apparent that when the parts are in the position shown in Fig. 1, at which time the bar 31 is in its normal or extended position, if said bar be moved inwardly the finger 34 will engage the roller 44 and move said roller to the right, thereby rocking the segmental gear 38 to move the rack-bar 35 upward. This carries the lug 30 upward and locks the plate in position, it being held in such position by the action of the toggle, which then occupies the position shown in Fig. 3. When this operation takes place, the operating-bar 31 is temporarily locked in its inner position by means of a latch 46, best shown in Fig. 7, which is in the form of a bell-crank lever, pivoted at 47 and having an arm 48, which engages in a notch 49 with which the bar 31 is provided, said notch being adapted to register with the arm 48 when the bar is shoved in to its innermost position. By swinging the arm 48 upward, the bar 31 will be released and may then return to its normal position under the action of the spring 33. The lever 46 is provided with a downwardly-extending arm 50, by which the said lever is rocked, as hereinafter described, to release the operating-bar 31.

For the purpose of arresting the inward movement of the plate when it is shoved into the shell so as to properly position it therein, I provide a stop 51, placed at the inner end of the shell. Said stop is in the form of a bell-crank lever, mounted upon a pin 52, carried by a horizontally disposed bracket or table 53, which is arranged within the shell and extends longitudinally thereof at about its center, as shown in Figs. 2 and 5, said bracket being supported upon the base 17, as shown. One of the arms of the stop lever 51 extends upward and is bifurcated, as shown at 54—55 in Fig. 15, the other arm extending longitudinally, as shown at 56 in Fig. 2 and embracing a vertical bolt 57, which carries a spring 58. The bolt 57 is screwed into the bracket 53 and carries one or more nuts 59 at its upper end, so that the action of the stop, and consequently the position of the plate with reference to the end cutters, may be adjusted. Obviously, when the stop-lever 51 is rocked to move the arm 56 upward, the spring is compressed, so that the spring tends to hold the arm 56 in its horizontal position and consequently normally holds the bifurcated arm of said lever in a vertical position. The arms 54—55 of the stop-lever 51 are provided with recesses in which are fitted the stems 60—61 of stops 62—63, springs 64—65 serving to cause said stops to project upward, as shown in Figs. 15 and 16. By pressing downward on the stops 62—63, however, the stops 62—63 may be moved downward against the tension of the springs 64—65. The normal position of the stop-lever 51 is shown in Fig. 2 and when in such position the stops 62—63 are in position to intercept the leading end of the plate as it is moved into the shell, so that further inward movement of said plate after it engages said stops moves said stops slightly to the right, the stop-lever rocking about its pivot 52. The position of the nuts 59 on the bolt 57, however, limits the extent of this movement and arrests the plate when it has been properly positioned in the shell. The position of the stops 62—63 is such that when the plate 29 has been lifted to move it into locking position, as hereinbefore described, it moves up above the upper margins of said stops and consequently said stops are returned to their normal position by the action of the spring 58 and then underlie the leading end of the plate, so that when the plate is unlocked and again rests on the ledges 27—28, the stops are pressed down by it. In order that the stops may present flat surfaces to the plate when they are moved back by it, their operative faces are beveled, as shown at the left in Fig. 16, and their upper margins are rounded so as to conform to the curvature of the plate.

When the plate has been properly positioned in the shell and locked therein, the shell is automatically set in rotation by mechanism which will now be described.

66 indicates an annular rack or gear which is mounted upon the shell 24, as shown in Fig. 2, and is normally loose or disconnected therefrom. Said gear is constantly driven by means of a worm 67, mounted on a shaft 68, journaled in suitable bearings in the base, as shown in Figs. 2 and 6, said shaft being driven from the main drive shaft 18 through beveled gears 69—70, mounted respectively upon the shaft 68 and a shaft 71. The shaft 71 extends longitudinally of the base and carries a gear 72, which meshes with the pinion 22, as best shown in Fig. 12; thus whenever the motor 19 is in operation the gear 66 is driven and rotates idly except when the shell is operatively connected with it by the mechanism which will now be described.

73 indicates a pawl, which is pivotally mounted upon the gear 66, as shown at 74 in Fig. 6, said pawl having a sharp corner or engaging portion 75, which is adapted to enter an indentation 76 in the outer surface of the shell, as best shown in Fig. 6. In the construction shown, the indentation 76 is not formed directly in the material of which the shell is composed, but said shell is recessed to receive a hardened steel plate 77 in which the indentation referred to is formed, thus providing for readily maintaining the indentation in proper condition by the renewal of the plate 77. The lower portion of the pawl is normally pressed inward so that it will enter the indentation 76, by a spring 78, best shown in Fig. 6. The pawl 73 is also provided with a hardened block 79, arranged above its pivot and on the outer surface of the pawl, this block being employed to move the pawl out of operative engagement, as hereinafter described, to disengage the gear 66 from the shell 24 at the end of each complete rotation of the shell. It will be apparent that normally the pawl 73 stands in its innermost position, so that unless held out of operative position it will connect the gear 66 with the shell 24.

80 indicates a detent lever, the construction of which is best shown in Figs. 6 and 11. Said lever is pivoted intermediately upon a pivot 81, adjacent to the gear 66, the lower portion of said lever being adapted to swing toward and from the pawl 73 and having a block 82 which is adapted to move into the path of the block 79 so as to intercept it. When this occurs the downward movement of the pawl 73 incident to the rotation of the gear 66 causes the lower portion of the pawl 73 to swing outward, thereby disengaging the pawl from the shell 24 and consequently disconnecting the shell from the gear 66. In order to disconnect the lower portion of the detent lever 80 from the block 79 when its function of disconnecting the shell has been performed, the pawl is provided with an outwardly projecting nose 83, which lies below the block 79, and operates when the lower portion of the pawl is swung outward to engage the lever 80 and swing it out so that its block 82 disengages the block 79, thereby allowing the pawl to continue past said lever as the gear 66 rotates. The lower portion of the lever 80 is normally pressed inward so as to hold it in position to engage the block 79 of the pawl by means of a spring 84, which bears upon a button 85, as shown in Figs. 1 and 6. The upper end portion of the detent lever 80 lies adjacent to the operating bar 31, as shown in Fig. 6, and has a beveled portion 86, which is adapted to be engaged by a roller 87, mounted on the operating bar 31 in such position that when the operating bar is shoved in to lock the plate in position, said roller will engage the beveled portion 86 of the detent lever 80 and swing it to the position shown in Fig. 6, thereby leaving the pawl 73 free to engage the shell 24 and operatively connect it with the gear 66 and thereby cause it to rotate. Fig. 6 illustrates the parts in the positions they occupy just after the plate has been locked in position in the shell and before the shell starts to rotate, so that it will be seen that the detent lever 80 is not moved out of position to engage the pawl until the plate has first been locked in position, and consequently the shell cannot be rotated until after such locking has been effected.

In order to permit the operating or locking bar 31 to return to its original position immediately after having accomplished its purpose in locking the plate and causing the shell 24 to rotate, the shell 24 is provided with a lug or cam 88, which projects so as to engage the depending arm 50 of the lever 46 as the shell rotates, such engagement taking place shortly after the rotation of the shell begins. This is best shown in Fig. 6 wherein the cam 88 and the arm 50 of the lever 46 are both shown in dotted lines. As the cam 88 moves around it strikes the lower end of the arm 50, thereby swinging the arm 48 out of engagement with the operating or locking bar 31, which at once returns to its original position under the action of the spring 33. This permits the detent lever 80 to return to its original position so that its block 82 lies in the path of the block 79 and will engage said block upon the completion of the rotation of the shell, thereby again disconnecting the shell from the gear 66 and stopping it.

When the shell 24 stops, the gear 66 continues to rotate, as hereinbefore suggested, and then acts to release the plate and permit it to drop back upon the ledges 27—28. This is effected by a cam 89, carried by the gear 66, best shown in Fig. 3. As said gear continues to rotate, the cam 89 moves down and engages the roller 44, so as to swing the toggle over to the left, thereby moving the rack 35 down and carrying the lug 30 down below the ledge 28, thus permitting the adjacent edge of the plate to rest upon said ledge 28 in the position it originally occupied when moved into the shell, as illustrated in dotted lines in Fig. 9.

When the plate is moved into the shell the side edges are centered properly by gages 90—91, carried by the bracket 53, as best shown in Figs. 6 and 9, said gages being so set in position that they engage the inner marginal portions of the plate. During the rotation of the shell the internal ribs of the plate are properly shaved by means of a shaving-blade 92, carried by the bracket 53, as shown in Figs. 6 and 9, this operation being the same as in other machines of this character. At the same time the tail-piece or riser is cut off from the adjoining end of the plate by means of an end cutter 93, mounted on a shaft 94, and preferably protected by a guard 95, as best shown in Fig. 5. The end cutter 93, and also a similar end cutter which trims the opposite end of the plate and is similarly mounted, are rotated by means of a linkbelt 96, operating on the sprocket-wheel 23 and on a corresponding sprocket-wheel 97, mounted on the shaft 94, as best shown in Fig. 12. The riser is supported as it is being severed by a roller 98, suitably disposed on the frame of the press, as best shown in Fig. 5.

When the shell 24 has completed its rotation, it is stopped at the proper point and held in such position by means of a detent 99 in the form of a bellcrank lever, mounted on a pivot 100, as shown in Fig. 5. Said detent carries a roller 101 on its upwardly-extending arm, which roller is adapted to engage in a suitable recess provided in a block 102, carried on the outside of the shell, as illustrated in dotted lines in Fig. 5. The roller 101 is pressed inward so as to engage the block 102, by a spring 103, mounted on a rod 104, as also shown in Fig. 5; thus the stoppage of the shell at the proper point is insured.

When the plate has been finished, as above described, and has dropped back upon the ledges 27—28, it is ready to be withdrawn from the finishing shell and cooled. It has already been explained that at this time the plate rests upon the upper margins of the stops 62—63 so that it can be drawn out over such stops. To prevent rattling, and interference of the stops with the withdrawal of the plate through engagement thereof with the ribs on the inside of the plate, the outer faces of said stops are made broad enough so that they are wider than the spaces between the adjacent ribs, and consequently the plate rides out over the stops smoothly.

Fig. 2 shows the plate finished and ready to be withdrawn from the finishing shell. This withdrawal of the plate is accomplished by means of gripping mechanism, which acts automatically to grip the leading end of the plate and draw it out of the shell 24 into the cooling device. As best shown in Fig. 2, 105 indicates the housing of the cooling apparatus, which is placed in alinement with the finishing shell and is provided with rails 106 which extend longitudinally therethrough, so that the edges of the plate may rest and move thereon. The plate is moved from the finishing shell 24 into the cooling housing 105 by means of a reciprocating rack-bar 107, which is mounted to slide in a suitable bracket 108, supported by the frame of the machine and extending longitudinally over the housing 105, as shown in Fig. 2. Said rack-bar is reciprocated by means of a gear 109 which meshes with the teeth of said bar, the arrangement being such that by rotating the gear 109 first in one direction and then in the other, the rack-bar 107 is caused to reciprocate. The rotation of the gear 109 alternately in opposite directions is effected by means of a segmental gear 110, carried by a lever 111, which is pivoted upon a stud 112, as shown in Fig. 12, said gear 110 meshing with a pinion 113, mounted on a shaft 114, which also carries the gear 109, as also shown in Fig. 12. The lower end of the lever 111 is connected by a crank-block 115 with a disk 116, said crank-block being adapted to slide longitudinally of the lever 111 in suitable ways provided in the lower end of said lever. Obviously, by rotating the disk 116, the lever 111 will be rocked upon its pivot, thereby reciprocating the rack-bar 107. The disk 116 is mounted on a shaft 117, extending transversely of the base, and carries a worm-gear 118, which meshes with a worm 119, on the shaft 71, as best shown in Figs. 6 and 12; thus the shaft 117 is driven from the main drive shaft 18.

The rack-bar 107 is provided with a depending bracket 120, which projects through a slit in the upper portion of the housing 105, the latter being preferably made of two curved sections spaced apart, as shown in Fig. 12. The bracket 120 supports one end portion of a horizontally-disposed swinging arm 121, which carries two gripping jaws 122—123, best shown in Figs. 13 and 14.

These jaws are scissors-like in construction, being crossed and pivoted together at 124, the jaw 123, however, being stationary with relation to the arm 121. They are adapted to engage the leading end of the plate, as shown in Fig. 2, so that when closed they may be employed to draw the plate out of the finishing shell and move it into the cooling device. The position of the jaw 122 when open is shown in Fig. 3. As will be seen from the illustrations, the jaw 122 is connected by a swinging bolt 125, with a boss 126, secured to the arm 121, said bolt passing through an eye in a lug 128, carried by the boss 126. A spring 129 is mounted on the bolt 125 and bears against the lug 128, as shown in Fig. 13. This construction forms a toggle connection by which the jaw 122 is held either in its open or in its closed position, and by swinging the bolt 125 in one direction or the other, said jaw may be either opened or closed, depending on the direction in which the bolt is swung. The jaw 122 is provided with an upwardly-projecting finger 130, as best shown in Figs. 13 and 14, which is employed to swing the jaw 122 to close it at the proper time, and is also employed to open said jaw to release the plate after it has been deposited in the cooling device. 127 indicates a roller at the upper end of the arm 121, for a purpose to be hereinafter explained.

It will be evident that as the rack-bar 107 is constantly reciprocating and the jaws 122—123 are carried by it, they will be moved alternately toward and from the outlet end of the finishing shell, and that in order to prevent said jaws from seizing a plate immediately after it is placed in the finishing shell and before it is finished, it is necessary that some mechanism be provided which will prevent the jaws from seizing a plate until it is ready to be discharged from the finishing device, and which will allow the jaws to engage the plate and withdraw it when it has been finished. For this purpose I provide a vertically movable stop 131, which projects downward into the path of the stationary jaw 123 when the plate is not ready to be delivered, but which is automatically moved up out of the path of said jaw when a plate is ready for delivery, so that in the latter instance the jaws may move closer to the finishing shell and engage the plate, whereas at other times they are stopped before they enter the finishing shell. This stop 131 is provided with slots 132, through one of which extends a bolt 133, provided with a head which frictionally engages the stop 131 and holds it either in its upper or its lower position. A guide pin 134 passes through the other slot 132, as shown in Fig. 4. The stop 131 is moved downward into position to engage the jaw 123 by means of a roller 135, carried by the rack-bar 107, as shown in Fig. 3, said roller being arranged to engage an upwardly-extending arm 136, carried by the stop 131, as shown in Figs. 4 and 13, as the rack-bar 107 reciprocates. As best shown in Fig. 13, the upper end of the arm 136 is beveled so that as the rack-bar 107 moves to the right this roller 135 engages said arm and moves the stop 131 down into operative position. The manner in which said stop engages the jaw 123 is best shown in Fig. 3.

The stop 131 is moved up out of operative position, to permit the jaws to engage the plate at the proper time, by means of the lug 88, shown in Fig. 6, which is so disposed upon the shell that it engages the shoulder 137 on the stop 131 shortly before the shell comes to rest, said cam acting to move the stop up high enough so that the jaw 123 clears it, and may move far enough to the left to engage the plate as illustrated in Figs. 1 and 13. The jaws are closed by engagement of the finger 130 with the lower end of the stop 131 so that movement of the jaws to the left rocks the jaw 122 into gripping position. The stop 131 is held in either of its positions by friction of the bolt-head 133, or of washers 138 which may be interposed between said head and the stop, as best shown in Fig. 3.

In view of the fact that the stroke of the rack-bar 107 is constant, when the gripping jaws are held back and are not permitted to make a full stroke, as is the case when they are intercepted by the stop 131, it is necessary that a certain amount of lost motion be provided between the arm 121 which carries the jaws, and the bracket 120, so that to a slight extent said bracket and the rack-bar 107 may move independently of the arm 121. This is accomplished by providing said arm with a longitudinal slot 139 at the point of its connection with the bracket 120, said arm being connected to the bracket by a pin 140, which passes through said slot, as shown in Fig. 13. For the purpose of yieldingly holding the arm 121 in the extended position shown in Fig. 13, a spring 141 is provided which is mounted on a rod 142, one end of said rod being connected to a vertically disposed arm 143, carried by the bracket 120, as shown in Fig. 13. The other end of said rod bears against an upwardly-extending arm 144, carried by the arm 121, as best shown in Fig. 3, and consequently tends to move the arm 121 to the left, as shown in Fig. 13, but permit it to yield when the jaw 123 is intercepted by the stop 131.

The arm 121 is held in its normal or horizontal position by means of a locking bar 145, which is pivotally connected with the rack-bar 107, by a pivot 146, shown in Fig. 13. The lower end of said bar is provided with an angular slot 147, in which fits a pin 148, projecting laterally from the arm 121, the arrangement being such that when the pin 148 is in the position shown in Fig. 13, the arm 121 is locked against upward movement, but by swinging the lower end of the locking-bar 145 to the right, as shown in Fig. 14, so that the pin 148 may enter the projecting portion of the slot 147, the arm 121 may then swing upward to the position shown in Fig. 14. The locking-bar 145 is normally held in the position shown in Fig. 13 by means of a spring 149, mounted on a rod 150, one end of which is connected with the arm 143, its other end bearing against the locking-bar 145. This spring acts to swing the lower end of the locking-bar 145 to the left, when the arm 121 is moved downward, so that the pin 148 lies in the lower portion of the slot 147. A spring 151 is connected with the pins 146 and 148 which tends to lift the arm 121 and consequently moves said arm up whenever the lower end of the locking-bar 145 is moved over to the right far enough to bring the pin 148 under the upwardly-extending portion of the slot 147. The object of providing this upwardly-swinging movement of the arm 121 is to lift the gripping jaws high enough to clear the plate after it has been deposited in the cooling device, on the return movement of said jaws. Obviously, as the rack-bar 107 moves to the left after having deposited a plate in the cooling device, unless the jaws were raised high enough to clear the plate, they would move it back out of the cooling device and the machine would not be operative.

The opening of the jaws to release the plate is accomplished by means of a finger 152, which is pivotally mounted in a bracket 153 and normally is in a horizontal position resting upon a supporting pin 154, shown in Fig. 2. The finger 152 has a beveled end 155, which is adapted to engage the finger 130, carried by the jaw 122 when the jaws have been moved far enough to the right to deposit the plate in the cooling device, and consequently said jaw is rocked to open it. Further movement of the rack-bar 107 to the right causes the upper end of the locking-bar 145 to engage a laterally-projecting pin 156, carried by the bracket 108, or other stationary support, as best shown in Figs. 2 and 14, which swings the lower end of said locking-bar to the right, bringing the pin 148 opposite the upwardly-projecting portion of the slot 147, as shown in Fig. 14, and consequently said pin moves up in said slot under the action of the spring 151, raising the arm 121 to the position shown in Fig. 14. The jaws, therefore, are lifted so that when the rack-bar 107 returns to the left, they pass above the plate in the cooling device. This action also swings the finger 152 up to the position shown in Fig. 14 since the finger 152 rests on the finger 130 and consequently swings up with it. After passing the plate, the arm 121 is restored to its horizontal position by means of a cam 157, secured to the bracket 108 a short distance from the stop 131 and adapted to engage the roller 127, as best shown in Figs. 2 and 3, the cam being so shaped that when engaged by said roller it moves the arm 121 down into its horizontal position. This, however, does not close the jaws, which remain open ready to seize another plate if they should be allowed by the stop 131 to engage it.

After the plate has been properly deposited in the cooling device it is cooled by means of a series of brushes 158, mounted upon a shaft 159, extending axially through the cooling apparatus, as shown in Figs. 2 and 12. Said brushes are arranged to bear upon or wipe the entire inner surface of the plate as the shaft 159 rotates, a series of said brushes being provided in more or less staggered relation to each other. The several brushes are also adapted to engage an inclined plate 160 disposed at the under side of said brushes and supplied with water through a pipe 161, as shown in Fig. 12, the arrangement being such that as the brushes rotate they take up a small amount of water from the plate 160 and brush or wipe it over the inner surface of the stereotype-plate 29, so that said plate is cooled without accumulating any free water. The shaft 159 rotates rapidly and consequently the plate is quickly cooled. Said shaft is driven from the gear 72 by means of a pinion 162, mounted on a stud 163, and meshing with a gear 164, mounted on the shaft 159, as best shown in Figs. 2 and 12.

After the plate has been cooled it is pushed out of the cooling device on to the rails 106 by means of a lug 165 carried by the jaw 123, as shown in Fig. 2, and is then ready to be placed upon the press without drying, as the plate does not retain any appreciable amount of the moisture applied to it in the cooling operation.

The operation of the different parts of my improved machine has been described in connection with the detailed description of the several parts, but it may be briefly summarized as follows: The stereotype plate as it comes from the casting machine with the riser attached, is moved by hand into the shell 24, its side margins resting upon the ledges 27—28. When the plate has been shoved into the proper position, it is locked in the shell before the shell begins to rotate by pushing the locking bar 31 into the limit of its movement. This inward movement of the locking bar, through the finger 34, operates the segmental gear 38 to raise the rack-bar 35, thereby forcing up the lug 30 on which one margin of the stereotype plate rests, and consequently lifting the plate into close engagement with the inner surface of the shell. The toggle mechanism associated with the segmental gear 38 locks the lug 30 in its uppermost position. The locking bar 31 is locked in its innermost position by the latch 46, which engages the notch 49 in said bar 31. When the plate is moved into the shell and before it engages the arms 54—55 of the stop 51, the latter arms are in a vertical position, being held so by the spring 58, but the leading end of the plate engages said arms shortly before the plate reaches the right position for the locking devices to operate, and when the plate is shoved to the limit of its movement, the arms 54—55 are swung over slightly by the further movement of the plate, as indicated in Fig. 3. When the plate is moved up into engagement with the shell, this releases the arms 54—55 of the stop 51, which then return to their vertical position, the stops 62—63 being then underneath the leading end of the plate, as shown in Fig. 6; consequently, when the plate is released it drops down upon the stops 62—63, presing them downward into their supports. Thus the stops do not then interfere with the withdrawal of the plate from the shell over said stops.

When the plate has been properly positioned in the shell and locked therein, the shell is caused to rotate by connecting it with the constantly-rotating gear 66, which, as previously explained, is normally loose upon the shell. The connection between the shell and the gear 56 is effected when the operating bar 31 is shoved in, since, as explained, said bar carries a roller 87 which engages the beveled portion 86 of the detent lever 80 and consequently swings said lever so as to release the pawl 73 and permit said pawl to enter the indentation 76 in the outer surface of the shell, thereby causing the shell to rotate with the gear 66. When the operating bar 31 has performed its functions, the latch 48 is released automatically by the cam 88 carried by the shell, whereupon the operating bar 31 returns to its normal or outermost position under the action of the spring 33. The detent lever 80 thereupon returns to position to engage the pawl 73 when said pawl is carried around by the rotation of the shell, and therefore automatically disconnects the shell from the gear 66 when a complete rotation has been accomplished. The shell is properly positioned when it has been disconnected from the gear 66 by the detent 99 shown in Fig. 5.

The gear 66 continues to rotate and effects the release of the plate so that it may drop back upon the ledges 27—28 through the cam 89 best shown in Fig. 3. This cam moves down and engages the roller 44 on the toggle locking mechanism, thereby moving the bar 35 down and carrying with it the lug 30 so that the edge of the plate resting on said lug may drop upon the ledge 28 to the position it originally occupied. During the rotation of the shell the internal ribs of the plate are properly shaved by the shaving-blade 92 and at the same time the tailpiece or riser is cut off, the latter operation being performed by the end cutter 93, while the shaving is done by the shaving-blade 92. Both ends of the plate are trimmed, an end cutter similar to the cutter 93 being provided for the opposite end of the plate.

When the plate has been finished and unlocked, it is withdrawn from the shell by means of the gripping mechanism shown in Figs. 3, 13, and 14, its leading end being seized between the jaws 122—123, and is drawn into the cooling device, where the jaws release it under the action of the finger 152. The arm 121 is then raised automatically by the spring 151 so that the gripping mechanism can pass back over the plate to its original position. The manner in which the gripping jaws operate has been quite fully explained and it is believed to be unnecessary to go into this matter again in detail.

After the plate has been placed in the cooling device, it is cooled in the manner described, and is then pushed out of the cooling device on to the rails 106, as explained.

The construction and operation of the cooling mechanism is not claimed herein, as it forms the subject-matter of a separate application, and the same is true of the mechanism by which the plate is moved out of the cooling device after it has been cooled.

That which I claim as my invention, and desire to secure by Letters Patent, is,—

1. A stereotype-plate finishing machine, comprising a rotary shell, means for supporting the plate therein, means acting independently of the rotation of the shell for locking the plate in position therein, an actuating device for actuating said locking mechanism, and means controlled by said actuating device for rotating the shell.

2. A stereotype-plate finishing machine, comprising a rotary shell having means for supporting the plate therein, means acting independently of the rotation of the shell for locking the plate therein, an actuating device for actuating said locking mechanism, a gear adapted to rotate independently of the shell, means for connecting said gear with the shell for rotating the latter, and means associated with said actuating device for controlling the connection of said gear with the shell.

3. A stereotype-plate finishing machine, comprising a rotary shell, means for supporting the plate therein, means acting independently of the rotation of the shell for moving the plate into close contact with the shell and to lock it in position therein, an actuating device for said locking mechanism, means for rotating the shell, said rotating means being adapted to be connected to and disconnected from the shell, and means associated with said actuating device for controlling the connection of said rotating means with said shell.

4. A stereotype-plate finishing machine, comprising a rotary shell having means for receiving and supporting the plate therein, a lug movable in said shell to lift the plate into close contact therewith and to lock it in position, a rack connected with said lug, a gear meshing with said rack and operating to move the same to lock or unlock the plate, an operating-bar, and means actuated by the movement of said bar for operating said gear to lock the plate in position.

5. A stereotype-plate finishing machine, comprising a rotary shell having means for receiving and supporting the plate therein, a lug movable in said shell to lift the plate into close contact therewith and to lock it in position, a rack connected with said lug, a gear meshing with said rack and operating to move the same to lock or unlock the plate, an operating-bar, means actuated by the movement of said bar for operating said gear to lock the plate in position, and means for moving the gear in the opposite direction to release the plate after the rotation of the shell ceases.

6. A stereotype-plate finishing machine, comprising a rotary shell having means for receiving and supporting the plate therein, a lug movable in said shell to lift the plate into close contact therewith and to lock it in position, a rack connected with said lug, a gear meshing with said rack and operating to move the same to lock or unlock the plate, an operating-bar, means actuated by the movement of said bar for operating said gear to lock the plate in position, means for rotating the shell, said rotating means being adapted to be connected with or disconnected from said shell, and means associated with said operating-bar and actuated when said operating bar is moved to lock the plate in position for connecting said rotating mechanism with the shell.

7. A stereotype-plate finishing machine, comprising a rotary shell having means for receiving and supporting the plate therein, a lug movable in said shell to lift the plate into close contact therewith and to lock it in position, a rack connected with said lug, a gear meshing with said rack and operating to move the same to lock or unlock the plate, an operating-bar, means actuated by the movement of said bar for operating said gear to lock the plate in position, means for rotating the shell, said rotating means being adapted to be connected with or disconnected from said shell, means associated with said operating-bar and actuated when the operating bar is moved to lock the plate in position for connecting said rotating mechanism with the shell, and means for unlocking the plate when the rotation of the shell ceases.

8. A stereotype-plate finishing machine, comprising a rotary shell, a gear mounted on said shell and adapted to rotate independently thereof, means for operatively connecting said gear and said shell so that they rotate in unison, and means for automatically disconnecting the same when the shell has made one complete rotation.

9. A stereotype-plate finishing machine, comprising a rotary shell, a gear mounted on said shell and adapted to rotate independently thereof, mechanism for connecting said gear and said shell so that they rotate in unison, and means for actuating said clutch mechanism to disconnect said shell and said gear when the shell has made one complete rotation.

10. A stereotype-plate finishing machine, comprising a rotary shell, a gear mounted on said shell and adapted to rotate independently thereof, a pawl for connecting said gear and said shell, and means for automatically actuating said pawl to disconnect said shell and said gear when the shell has made one complete rotation.

11. A stereotype-plate finishing machine, comprising a rotary shell, a gear mounted thereon and adapted to rotate independently thereof, a pawl carried by said gear and adapted to engage said shell to cause said shell to rotate in unison with said gear, and means for automatically moving said pawl to cause it to release the shell upon the completion of the rotation of the latter.

12. A stereotype-plate finishing machine, comprising a rotary shell, a gear mounted thereon and adapted to rotate independently thereof, a pawl carried by the gear and adapted to engage the shell to cause the shell to rotate in unison with the gear, a detent normally in position to engage said pawl and hold it out of engagement with the shell, and means for moving said detent out of operative position to permit the pawl to operatively engage the shell.

13. A stereotype-plate finishing machine, comprising a rotary shell, a gear mounted thereon and adapted to rotate independently thereof, a pawl carried by the gear and adapted to engage the shell to cause the shell to rotate in unison with the gear, means acting independently of the rotation of the shell for locking the plate therein, means for actuating said locking means, and means associated with said actuating means for controlling the position of said pawl.

14. A stereotype-plate finishing machine, comprising a rotary shell, a gear mounted thereon and adapted to rotate independently thereof, a pawl carried by the gear and adapted to engage the shell to cause the shell to rotate in unison with the gear, means acting independently of the rotation of the shell for locking the plate therein, means for actuating said locking means, and a detent for holding said pawl out of operative engagement with the shell, said detent being movable out of operative position when said lock-actuating mechanism is operated to lock the plate in the shell.

15. A stereotype-plate finishing machine, comprising a rotary shell, a gear mounted thereon and adapted to rotate independently thereof, a pawl carried by the gear and adapted to enter a recess in the shell, a detent adapted to engage said pawl for moving it out of operative position, and means for moving said detent out of operative position.

16. A stereotype-plate finishing machine, comprising a rotary shell, a gear mounted thereon and adapted to rotate independently thereof, a pawl carried by the gear and adapted to enter a recess in the shell, a detent adapted to engage said pawl for moving it out of operative position, means for locking the plate in the shell, and means for moving said detent out of operative position when the plate is locked in the shell.

17. A stereotype-plate finishing machine, comprising a rotary shell, a gear mounted thereon and adapted to rotate independently thereof, a pawl carried by said gear and adapted to engage the shell, a detent lever pivoted between its ends and adapted to engage the pawl to hold it out of operative position, means for locking the plate in the shell, and a longitudinally-movable bar for actuating said locking mechanism, said bar being adapted to engage said detent lever for moving it out of operative position when the plate is locked in the shell.

18. A stereotype-plate finishing machine, comprising a rotary shell, a gear mounted thereon and adapted to rotate independently thereof, a pawl carried by said gear and adapted to engage the shell, a detent lever pivoted between its ends and adapted to engage the pawl to hold it out of operative position, means for locking the plate in the shell, a longitudinally-movable bar for actuating said locking mechanism, said bar being adapted to engage said detent lever for moving it out of operative position when the plate is locked in the shell, and means for temporarily locking said bar in position when it is actuated to lock the plate.

19. A stereotype-plate finishing machine, comprising a rotary shell, a gear mounted thereon and adapted to rotate independently thereof, a pawl carried by said gear and adapted to engage the shell, a detent lever pivoted between its ends and adapted to engage the pawl to hold it out of operative position, means for locking the plate in the shell, a longitudinally-movable bar for actuating said locking mechanism, said bar being adapted to engage said detent lever for moving it out of operative position when the plate is locked in the shell, means for temporarily locking said bar in position when it is actuated to lock the plate, and means for releasing said bar after the shell commences to rotate.

20. A stereotype-plate finishing machine, comprising a rotary shell, means for rotating said shell, locking mechanism acting independently of the rotation of the shell for locking the plate therein, and hand-operated mechanism for actuating said locking means.

21. A stereotype-plate finishing machine, comprising a rotary shell, means for rotating said shell, locking mechanism acting independently of the rotation of the shell for locking the plate therein, and hand-operated mechanism for actuating said locking means and for setting the shell in rotation after the plate has been locked in position.

22. A stereotype-plate finishing machine, comprising a rotary shell, a gear mounted thereon and adapted to rotate independently thereof, means for connecting said gear with said shell, means acting independently of the rotation of the shell for locking the plate in position therein, means for automatically disconnecting the shell from the gear when the shell has completed its rotation, and means connected with said gear for unlocking the plate after the shell stops.

23. A stereotype-plate finishing machine, comprising a rotary shell, a gear mounted thereon and adapted to rotate independently thereof, means for connecting said gear with the shell so that they rotate in unison, means for automatically disconnecting said shell and gear when the shell has completed its rotation, and means for holding the shell in proper position after it is disconnected from the gear.

24. A stereotype-plate finishing machine, comprising a rotary shell, a gear mounted thereon and adapted to rotate independently thereof, means for connecting said gear with the shell so that they rotate in unison, means for automatically disconnecting said shell and gear when the shell has completed its rotation, and a detent adapted to engage said shell and hold it in position after the gear is disconnected therefrom.

25. A stereotype-plate finishing machine, comprising a rotary shell, means for supporting a plate therein, said shell being open at both ends, a swinging stop adapted to arrest the plate when it has moved into the shell and to swing back under the plate when the latter is lifted into engagement with the shell, and means for lifting the plate into engagement with the shell and for locking the same in position.

26. A stereotype-plate finishing machine, comprising a rotary shell open at both ends and having means for receiving and supporting a plate, means for lifting the plate into engagement with the shell and for locking it in position, and a vertically-movable swinging stop adapted to intercept the plate when it is moved into the shell and to swing back under the plate when the latter is locked in position.

27. A stereotype-plate finishing machine, comprising a rotary shell open at both ends and having means for receiving and supporting a plate, means for lifting the plate into engagement with the shell and for locking it in position, a vertically-movable swinging stop adapted to intercept the plate when it is moved into the shell and to swing back under the plate when the latter is locked in position, and a spring for normally holding said stop in operative position.

28. A stereotype-plate finishing machine, comprising a rotary shell open at both ends and having means for receiving and supporting a plate, means for moving the plate into engagement with the shell and for locking the same in position, a bellcrank lever, and a stop carried by said lever and adapted to intercept the plate to limit its movement into the shell, said stop being vertically movable independently of said lever whereby when the plate is lifted into engagement with the shell said stop is adapted to swing under the plate.

29. A stereotype-plate finishing machine, comprising a rotary shell open at both ends and having means for receiving and supporting a plate, means for moving the plate into engagement with the shell and for locking the same in position, a bell crank lever, a stop carried by said lever and adapted to intercept the plate to limit its movement into the shell, said stop being vertically movable independently of said lever whereby when the plate is lifted into engagement with the shell said stop is adapted to swing under the plate, and a spring for normally holding said stop in operative position.

30. A stereotype-plate finishing machine, comprising a rotary shell, a constantly-driven gear mounted on said shell and rotatable independently thereof, means for locking the plate in the shell, means for automatically connecting said gear with the shell when the plate is locked in position, and means for automatically disconnecting the gear from the shell when the latter has completed its rotation.

31. A stereotype-plate finishing machine, comprising a rotary shell, means for supporting the plate therein, means acting independently of the rotation of the shell for locking the plate in position therein, an actuating device for actuating said locking mechanism, means for rotating the shell, and means for automatically unlocking the plate after the shell stops.

32. A stereotype-plate finishing machine, comprising a rotary shell, means for supporting the plate therein, means for locking the plate in the shell, means rotatable independently of the shell and adapted to be connected therewith for rotating the same, means for automatically disconnecting said rotating means from the shell, and means actuated by said shell-rotating means for unlocking the plate.

33. A stereotype-plate finishing machine, comprising a rotary shell having means for supporting the plate therein, means for locking the plate in the shell, an actuating device for actuating said locking means, a gear adapted to rotate independently of the shell, means for connecting said gear with the shell for rotating the latter, and means associated with said actuating device for starting the shell in rotation.

34. A stereotype-plate finishing machine, comprising a rotary shell having means for supporting the plate therein, means for locking the plate in the shell, an actuating device for actuating said locking means, a gear adapted to rotate independently of the shell, means for connecting said gear with the shell for rotating the latter, means associated with said actuating device for starting the shell in rotation, and means for automatically disconnecting said shell from said gear when the shell has completed one rotation.

35. A stereotype-plate finishing machine, comprising a rotary shell having means for supporting the plate therein, means for locking the plate in the shell, an actuating device for actuating said locking means, a gear adapted to rotate independently of the shell, means for connecting said gear with the shell for rotating the latter, means associated with said actuating device for starting the shell in rotation, means for automatically disconnecting said shell from said gear when the shell has completed one rotation, and means operated by said gear for unlocking the plate.

36. A stereotype-plate finishing machine, comprising a rotary shell, means for supporting the plate therein, a constantly-rotating gear, and means for intermittently rotating said shell by said gear.

37. A stereotype-plate finishing machine, comprising a rotary shell, means for supporting the plate therein, a constantly-rotating gear, means for intermittently rotating said shell by said gear, means for locking the plate in the shell, and means actuated by said gear for unlocking the plate after the shell stops.

38. A stereotype-plate finishing machine, comprising a rotary shell, means for supporting the plate therein, a constantly-rotating gear, means for intermittently rotating said shell by said gear, means for locking the plate in the shell before the shell begins to rotate, and means actuated by said gear for unlocking the plate after the shell stops.

39. A stereotype-plate finishing machine, comprising a rotary shell, a gear mounted thereon and adapted to rotate independently thereof, a pawl carried by the gear and adapted to engage the shell to cause the shell to rotate in unison with the gear, means for locking the plate therein, means for actuating said locking means, and means associated with said actuating means for controlling the position of said pawl.

40. A stereotype-plate finishing machine, comprising a rotary shell, a gear mounted thereon and adapted to rotate independently thereof, a pawl carried by the gear and adapted to enter a recess in the shell, a detent adapted to engage said pawl for moving ot out of operative position, means for locking the plate in the shell, means for moving said detent out of operative position when the plate is locked in the shell, and means operated by said gear for unlocking the plate after the shell stops.

41. A stereotype-plate finishing machine, comprising a rotary shell, a gear mounted on said shell, means for intermittently connecting said gear with said shell, locking mechanism acting independently of the rotation of the shell for locking the plate therein, and means operated by the rotation of said gear after the shell stops for unlocking the plate.

42. A stereotype-plate finishing machine, comprising a rotary shell, a gear mounted thereon and adapted to rotate independently thereof, means for connecting said gear with said shell, means for locking the plate in position in the shell, means for automatically disconnecting the shell from the gear when the shell has completed its rotation, and means operated by the rotation of said gear after the shell stops for unlocking the plate.

43. A stereotype-plate finishing machine, comprising a rotary shell, a constantly-driven gear mounted on said shell and rotatable independently thereof, means for locking the plate in the shell, means for connecting said gear with the shell when the plate is locked in position, and means for automatically disconnecting the gear from the shell when the latter has completed its rotation.

44. A stereotype-plate finishing machine, comprising a rotary shell, a constantly-driven gear mounted on said shell and rotatable independently thereof, means for locking the plate in the shell, means for connecting said gear with the shell when the plate is locked in position, means for automatically disconnecting the gear from the shell when the latter has completed its rotation, and means operated by the rotation of said gear after the shell stops for unlocking the plate.

45. A stereotype-plate finishing machine, comprising a shell adapted to receive and support a plate, means for locking the plate in position in the shell, and a reciprocating member having means for engaging the leading end of the plate and drawing it out of the shell after it is released.

46. A stereotype-plate finishing machine, comprising a shell adapted to receive and support a plate, means for locking the plate in position in the shell, and a reciprocating member having means for engaging the leading end of the plate and drawing it out of the shell after it is released, said withdrawing device being inoperative to engage the plate until it has been finished and released from the shell.

47. A stereotype-plate finishing machine, comprising a rotary shell adapted to receive a plate, means for intermittently rotating the shell, means for locking the plate in position in the shell, a reciprocating member having means adapted to engage the plate upon its release and withdraw it from the shell, and means adapted to prevent said plate-withdrawing means from engaging the plate until it has been released.

48. A stereotype-plate finishing machine, comprising a rotary shell adapted to receive a plate, means for intermittently rotating the shell, means for locking the plate in position in the shell, a reciprocating member having means adapted to engage the plate upon its release and withdraw it from the shell, and means movable into operative position by movement of said reciprocating member in one direction for preventing said plate-withdrawing means from engaging the plate until it has been released.

49. A stereotype-plate finishing machine, comprising a rotary shell adapted to receive a plate, means for intermittently rotating the shell, means for locking the plate in position in the shell, a reciprocating member having means adapted to engage the plate upon its release and withdraw it from the shell, controlling means movable into operative position by movement of said reciprocating member in one direction for preventing said plate-withdrawing means from engaging the plate until it has been released, and means operated by the rotation of the shell for moving said controlling means out of operative position.

50. A stereotype-plate finishing machine, comprising a rotary shell adapted to receive a plate, means for intermittently rotating the shell, means for locking the plate in position in the shell, a reciprocating member having means adapted to engage the plate upon its release and withdraw it from the shell, a stop adapted to prevent said plate-withdrawing means from engaging the plate, and means for moving said stop out of operative position just before the shell ceases to rotate.

51. A stereotype-plate finishing machine, comprising a rotary shell adapted to receive a plate, means for intermittently rotating the shell, means for locking the plate in position in the shell, a reciprocating member having means adapted to engage the plate upon its release and withdraw it from the shell, a stop adapted to prevent said plate-withdrawing means from engaging the plate, means for moving said stop out of operative position just before the shell ceases to rotate, and means actuated by said reciprocating member for restoring said stop to operative position.

52. A stereotype-plate finishing machine, comprising an intermittently rotating shell adapted to receive a plate, means for locking the plate in position therein, a reciprocating member, jaws carried thereby adapted to grip the leading end of the plate to withdraw it from the shell after it has been released, and means for actuating said jaws to cause them to grip the plate.

53. A stereotype-plate finishing machine, comprising an intermittently-rotating shell adapted to receive a plate, means for locking the plate in position therein, a reciprocating member, jaws carried thereby adapted to grip the leading end of the plate to withdraw it from the shell after it has been released, and means for actuating said jaws to cause them to grip the plate and for opening said jaws after the plate has been withdrawn.

54. A stereotype-plate finishing machine, comprising an intermittently-rotating shell adapted to receive a plate, means for locking the plate in position therein, a reciprocating member having jaws adapted to engage the leading end of the plate for withdrawing it from the shell, and a stop for closing said jaws to cause them to grip the plate.

55. A stereotype-plate finishing machine, comprising an intermittently-rotating shell adapted to receive a plate, means for locking the plate in position therein, a reciprocating member having jaws adapted to engage the leading end of the plate for withdrawing it from the shell, a stop for closing said jaws to cause them to grip the plate, said stop being movable into position to intercept one of said jaws to prevent the jaws from gripping the plate until it has been released from the shell, and means operated by the rotation of the shell for moving said stop out of position to intercept said jaw.

56. A stereotype-plate finishing machine, comprising an intermittently-rotating shell adapted to receive a plate, means for locking the plate in position therein, a reciprocating member having jaws adapted to engage the leading end of the plate for withdrawing it from the shell, a stop for closing said jaws to cause them to grip the plate, said stop being movable into position to intercept one of said jaws to prevent the jaws from gripping the plate until it has been released from the shell, means operated by the rotation of the shell for moving said stop out of position to intercept said jaw, and means carried by said reciprocating member for moving said stop into position to intercept said jaw.

57. A stereotype-plate finishing machine, comprising an intermittently rotating shell adapted to receive a plate, means for locking the plate in position therein, a constantly-reciprocating member having means adapted to engage the leading end of the plate to withdraw it from the shell, and means for controlling the actuation of said plate-engaging means to prevent the withdrawal of the plate until after it has been finished and released from the shell.

58. A stereotype-plate finishing machine, comprising a rotary shell adapted to receive the plate, a cooling device for cooling the plate, a reciprocating member for withdrawing the plate from the shell and moving it to the cooling device, said reciprocating member having means adapted to engage the leading end of the plate for removing it from the shell to the cooling device and having means for moving the plate out of the cooling device and means for preventing the operation of said reciprocating member to withdraw the plate from the shell until the shell stops.

59. A stereotype-plate finishing and cooling machine, comprising a rotary shell adapted to receive the plate, a cooling device for cooling the plate, a reciprocating member for withdrawing the plate from the shell and moving it to the cooling device, said reciprocating member having means adapted to engage the leading end of the plate for removing it from the shell to the cooling device, means for preventing the operation of said reciprocating member to withdraw the plate from the shell until the shell stops and means for lifting said engaging means above the plate after the latter has been deposited in the cooling device, whereby said reciprocating member may reciprocate without disturbing said plate.

60. A stereotype-plate finishing and cooling machine, comprising a shell adapted to receive the plate, means for locking the plate in the shell, a cooling device adjacent to said shell, a reciprocating member having jaws adapted to grip the leading end of the plate and move it into the cooling device, means for automatically closing said jaws upon the plate, means for preventing the operation of said reciprocating member to withdraw the plate until the plate has been released, means for releasing said jaws when the plate has been moved into the cooling device, and means for lifting said jaws above the plate after the plate has been released, whereby said jaws may reciprocate without disturbing the plate.

ROBERT T. JOHNSTON.

Witnesses:
 JOHN L. JACKSON,
 W. H. DE BUSK.

Copies of this patent may be obtained for five cents each, by addressing the "Commissioner of Patents, Washington, D. C."